United States Patent Office 3,719,425
Patented Mar. 6, 1973

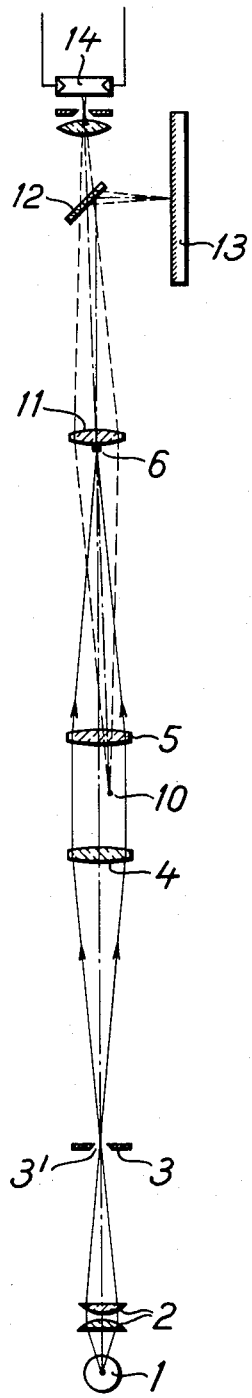

3,719,425
APPARATUS FOR MEASURING THE DIMENSION OF AN OBJECT
Ludwig Leitz and Willi Horn, Wetzlar, Germany, assignors to Ernst Leitz GmbH, Wetzlar, Germany
Filed May 15, 1970, Ser. No. 37,775
Claims priority, application Germany, May 20, 1969, P 19 25 587.9
Int. Cl. G01b 11/10
U.S. Cl. 356—159 2 Claims

ABSTRACT OF THE DISCLOSURE

A method of measuring the dimension of an object, for example the diameter of spinning fibres, comprises the steps of employing a Töpler optical arrangement and introducing the object into a beam of parallel light rays. The Töpler optical arrangement comprises a light source together with optical means for generating a beam of parallel light rays and a beam trap for absorbing those parallel rays. The light rays reflected from the parallel path by the object are conducted to a photoelectric receiver which provides an electrical output signal responsive to the intensity of the deflected light rays. This intensity being a measure of the dimension of the object.

BACKGROUND OF THE INVENTION

The field of the present invention is optical-electronical measuring devices, and the invention is particularly concerned with a method of measuring the diameter of spinning fibres and the like.

In the French Pat. No. 1,506,288 a method of measuring the diameter of fibres is disclosed which is an interference measuring method. This method utilizes the distance of the diffraction image, which distance depends directly on the fibre diameter, as the criterion of the measurement. However, it is a disadvantage of this method that the distance of the diffraction minima varies with a varying fibre diameter. As a consequence thereof not always the same portions of the photoelectric receivers which are allocated to the position of the minima are illuminated. Since photoelectric receivers are not of homogeneous sensitivity throughout their surface a varying light intensity is sensed which enters the result of the measurement as an error.

It is therefore an object of the present invention to provide a novel method of measuring the diameter of spinning fibres in a non-contacting manner.

SUMMARY OF THE INVENTION

The above stated object is attained by providing a method comprising the steps of employing a Töpler optical arrangement and introducing the object to be measured into a beam of parallel light rays, the arrangement being such that portions of the beam passing the object are absorbed by a beam trap while portions of the beam deflected by the object through diffraction or refraction are guided to a photo-sensitive receiver, which provides an electrical output signal responsive to the intensity of the deflected beam portions, the intensity being a measure of the dimension of the object.

The output signal of the receiver may be applied to a control circuit. If desired, a plurality of objects may be introduced into the beam of parallel rays. Advantageously, the light is of short wave length.

BRIEF DESCRIPTION OF THE DRAWING

The invention will be more fully comprehended from the following description when taken in conjunction with the appending drawing wherein is illustrated an apparatus for performing the invented method.

DESCRIPTION OF THE PREFERRED EMBODIMENT

As illustrated in the drawing, light from a lamp 1 illuminates via a condenser 2 a slit 3' of a diaphragm 3. The beam of rays passing through the slit 3' is converted by a collimator 4 into a beam of rays having a parallel light path. A following collimator 5 focuses the parallel beam of rays on to a beam trap 6, which absorbs these portions of the radiation. If an object 10 is now brought into the parallel light path, it influences portions of the parallel beam of rays through diffraction or refraction in such a manner that these portions are no longer focused on the beam trap 6, but are transmitted past it. An objective 11 mounted behind the beam trap guides these portions of the radiation through a beam splitter 12, on the one hand to a screen 13 for visual observation and on the other hand to a photoelectric receiver 14, the output signals of which are proportional to the integral of the number and size of the object or objects situated in the parallel light path.

If the output signal of this receiver 14 is fed into a control circuit and if the object situated in the parallel light path is, for example, a fibre issuing out of the spinneret of a machine coupled to the output of the control circuit, the thickness of the fibre may be regulated to within close tolerances by applying the method hereinbefore described.

Although the exemplified embodiment shows an arrangement operating with transmitted light, the apparatus may also be modified so as to operate with incident light. Thus, for example, the object 10 may be followed by a plane mirror, by which the light path illustrated is deflected. The mirror is advantageously so disposed that the illuminating beam of rays falls on it with slight inclination. The mirror surface may also provide a support for the object.

Since in the use of the described method, it is important that instability of brightness of the illumination should not influence the result of the measurement, one of the known methods (for example photometry or the feeding of the lamp through a stabilized mains apparatus) may be used in order to mitigate or eliminate such disturbing influences.

What is claimed is:
1. An apparatus for measuring the diameter of a thin fiber or thread comprising:
   (a) a lamp (1), a condenser (2) and a slit (3, 3') in the focal plane of a lens second collecing lens element (4) for generating a beam of parallel light rays,
   (b) a first collecting lens element (5) in the path of the parallel light beam,
   (c) a light absorbing stopper (6) in the focal plane of the collecting lens element (5) covering only slightly more than the image of the slit (3, 3') for absorbing the undisturbed light rays from the parallel beam,
   (d) a second collecting lens element (11) collecting behind the light absorbing stopper (6) the passing rays being deflected from the parallel beam by the thin fiber (10) introduced therein parallel to the slit (3, 3') and the stopper (6),
   (e) a diaphragm in an image plane of the fiber (10) behind the lens (11), the diaphragm transmitting only the fiber image,
   (f) a photoelectric receiver (14) arranged behind the diaphragm in the direction of light travel in an image plane of the light absorbing stopper (6), and
   (g) means for positioning the fiber (10) whose diameter is to be measured in the path of the beam of parallel light rays parallel to the slit (3, 3'), thereby diffracting light rays from their parallel path so that the rays are guided past the light absorbing stopper (6) onto the photoelectric receiver (14) wherein an electric pulse is generated the height of which represents a measure of the fiber diameter.

2. The apparatus as set forth in claim 1, wherein the lamp (1) produces light having a short wavelength.

References Cited

UNITED STATES PATENTS

| 3,540,831 | 11/1970 | Lovering | 356—164 X |
| 3,361,030 | 1/1968 | Goldberg | 356—103 |
| 3,561,875 | 2/1971 | Ried et al. | 356—103 |

FOREIGN PATENTS

| 688,653 | 3/1953 | Great Britain | 356—208 |
| 705,975 | 5/1971 | Germany | 356—201 |
| 714,350 | 8/1954 | Great Britain | 356—39 |

WILLIAM L. SIKES, Primary Examiner

F. L. EVANS, Assistant Examiner

U.S. Cl. X.R.

250—219 S, 219 WE; 356—164, 199